Feb. 18, 1958 J. M. HUNT 2,824,285

DIGITAL VOLTMETER

Filed Aug. 1, 1956 6 Sheets-Sheet 1

JOHN M. HUNT
INVENTOR

BY Darby & Darby
ATTORNEYS

Feb. 18, 1958 J. M. HUNT 2,824,285

DIGITAL VOLTMETER

Filed Aug. 1, 1956 6 Sheets-Sheet 2

JOHN M. HUNT
INVENTOR

BY Darby & Darby
ATTORNEYS

Feb. 18, 1958 J. M. HUNT 2,824,285

DIGITAL VOLTMETER

Filed Aug. 1, 1956 6 Sheets-Sheet 3

JOHN M. HUNT
INVENTOR

BY Darby & Darby
ATTORNEYS

Feb. 18, 1958 J. M. HUNT 2,824,285

DIGITAL VOLTMETER

Filed Aug. 1, 1956 6 Sheets-Sheet 4

JOHN M. HUNT
INVENTOR

BY Darby & Darby

ATTORNEYS

Feb. 18, 1958 J. M. HUNT 2,824,285

DIGITAL VOLTMETER

Filed Aug. 1, 1956 6 Sheets-Sheet 5

JOHN M. HUNT
INVENTOR

BY Darby & Darby
ATTORNEYS

JOHN M. HUNT
INVENTOR
BY Darby & Darby
ATTORNEYS 2,824,285

DIGITAL VOLTMETER

John M. Hunt, Hillcrest, Binghamton, N. Y., assignor to Link Aviation, Inc., Binghamton, N. Y., a corporation of New York Application August 1, 1956, Serial No. 601,481

11 Claims. (Cl. 324—99)

This invention relates to method and means for translating an electrical quantity such as a voltage into a digital indication, and more particularly to novel method and means for adapting such a device to respond to a given voltage of either positive or negative polarity irrespective of the polarity of a reference voltage with which the given voltage is compared. The invention further relates to compensation of such a device for errors due to transfer time of mechanical relays employed in necessary switching operations within the device.

Conversion devices are known in the prior art for translating electrical quantities into digital indications, as, for example, such are described in Convention Record of the I. R. E., 1953 National Convention, part 7, pages 7–12, "An analog-to-digital converter with an improved linear-sweep generator," by D. W. Slaughter. Such prior art devices usually compare a voltage to be measured with a reference voltage by means of a time-sweep or saw-tooth wave which starts at zero and either increases or decreases as a function of time (ramp function) through positive or negative values, not both, so that the device is adapted to measure one polarity or unknown voltage more particularly than the other polarity. In the present invention, the ramp function or sweep characteristic is adapted to cover a range between a material positive value and a material negative value, and the sequence of operations is altered automatically according to whether the voltage to be measured is positive or negative. The reference voltage may be either positive or negative and need not be replaced to accommodate a change in the polarity of the voltage to be measured. In other words, a sweep characteristic of given algebraic sign of rate of voltage change as a function of time, i. e. either positive or negative rate of change is utilized for measuring any voltage within the range of the device whether the voltage to be measured is positive or negative.

If it is desired to measure very small voltages, it is possible to encounter a situation wherein the finite transfer time of the relay which transfers the comparator input lead from ground to signal or vice versa may be greater than the time interval required for the integrator time-sweep to change from its initial value to the magnitude of the small input signal. With conventional relays this minimum time interval is of the order of ten milliseconds, but may be less than one millisecond through the use of very fast relays. Unless the system is especially arranged it is apparent that an irreducible minimum exists in the magnitude of voltage which can be measured, this minimum being dependent upon the time constant of the integrator system and transfer time of the relay or relays involved. If it is desired that the system operate down to zero voltage, a small fraction of the actuating voltage of the integrator (perhaps one-tenth of one percent) can be added to the voltages to be combined at the input of the comparator. This additional input signal will then cause the comparator system to measure the composite input signal, which is slightly higher in value than the actual voltage to be measured, with a corresponding increase in the reading of the output counter resulting from the increased length of the interval between the two comparator pulses. If, however, a count corresponding to the magnitude of the corrective voltage added to the input to the comparator is subtracted from the counter reading, the effect of the small offset voltage is nullified as far as the observer is concerned. The correction in indicated count may be achieved by pre-setting the counter at the start to a given number of counts below zero, or, as in the preferred embodiment herein disclosed, a fixed number of counts may be discarded by manipulation of the counter system. For example, a system employing an integrator having a run-down rate of 100 volts per second and counters operating at a 100 kilocycle rate, will accumulate 100,000 counts in measuring a 100 volt signal, each count representing one millivolt. If a ten millisecond interval is required to provide bounce-free relay transfer, an offset voltage of 1000 millivolts is added and the first 1000 counts are rejected. A ten millivolt input signal will appear to the comparator to be 1.010 volts, with a resultant count of 1010 pulses. Since the first 1000 counts are automatically rejected, the actual indication is 000010, correctly corresponding to the actual 10 millivolt signal.

It is therefore an object of the invention to increase the versatility of digital voltmeters.

A more specific object is to enable the device to measure a voltage of either polarity without replacing the source of reference voltage or changing to a reference voltage of reversed polarity.

Another object is to enable the device to adjust itself automatically to either polarity of voltage to be measured.

Another object is to extend the usefulness of a digital voltmeter into a range of smaller voltages than could otherwise be measured on account of the transfer time of a relay or relays.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

Figs. 4–7 are to be arranged to form a complete schematic diagram of the system of Fig. 1.

Figure 1:
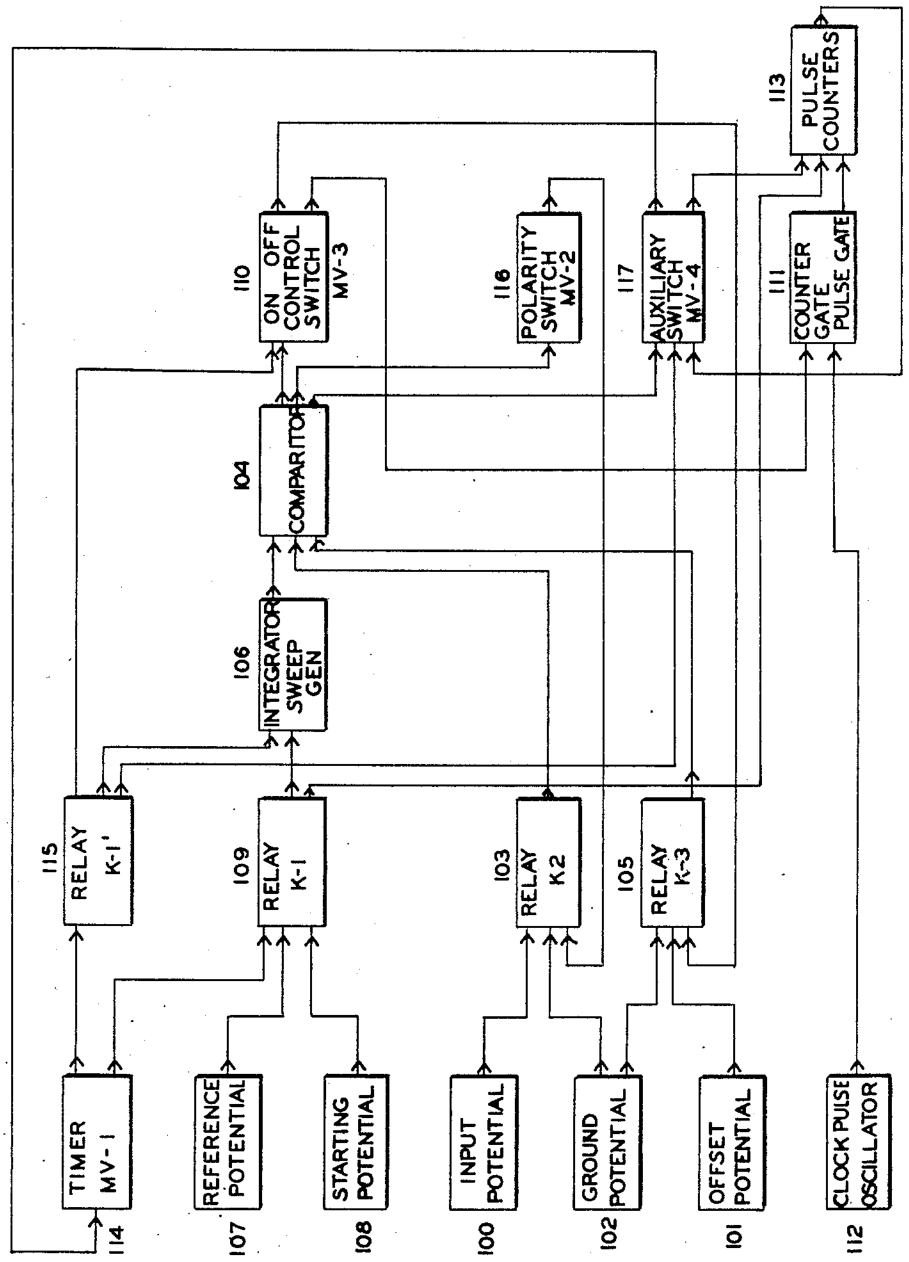
Fig. 1 is a block schematic diagram of the relationships between the various parts of a measuring system embodying the invention.

Fig. 1 is a block diagram which shows a source 100 of input potential or voltage to be measured, some times referred to as the signal voltage, or signal. For purposes of the invention, either the input potential from source 100 or ground potential from a ground potential source or lead represented schematically at 102 may be selected by a relay 103, otherwise designated the K2 relay, and supplied to one of three input leads of a comparator 104. Also for purposes of the invention, either an offset potential from a source 101 or ground potential from source 102 may be selected by a relay 105, otherwise designated the K3 relay, and supplied to a second input lead of the comparator 104. To a third input lead of the comparator 104 is applied the output from a linear integrator or sweep generator 106 which is in turn actuated by a source 107 of reference potential and a source 108 of starting potential selectively controlled by a relay 109 otherwise designated the K1 relay. The output from the comparator 104 is applied to an on-off control switch 110 which in turn controls a counter gate or pulse gate 111, which is interposed between a clock pulse oscillator 112 and a set of pulse counters 113.

Automatic operation of the system is provided for by means of a timer 114, a relay 115 otherwise designated the K1′ relay, a switch 116 referred to as the polarity switch, and a switch 117 referred to as an auxiliary switch. The timer 114, which includes a free-running multivibrator MV–1, controls the operation of the K1 and K1′ relays and is in turn externally controlled by the auxiliary relay 117. The relays 115, K1′, exercises controls over the on-off control switch and the auxiliary switch and in addition controls the starting and operating conditions of the integrator 106. The polarity switch 116 is controlled by the output of the comparator 104 and controls in turn the operation of the K2 relay. The auxiliary switch 117 is controlled by the comparator 104 and by the relay K1′. The auxiliary switch in turn exercises a control upon the timer 114 and in addition has a control loop through the pulse counters 113. Further controls are exerted by the K1 relay upon the pulse counters 113 and by the on-off switch 110 upon the K3 relay. The nature of these connections and controls will be explained in detail hereinafter with reference to the detailed circuitry shown in Figs. 2–5.

Since the basic system is known it is believed unnecessary to describe it more than in general terms. The device functions by converting the input potential into a time interval which is measured by a precision timing device, the value of which interval may be displayed in digital form in known manner. The display system is simply the output of a sequential counter which counts pulses from a constant frequency pulse source, thereby converting the time interval (which itself has been constrained to be proportional to the input voltage) into a digital display representing a number proportional to the time interval.

The method of converting the direct current voltage to a precise time interval involves the use of a feedback electronic integrator and a comparator circuit. The integrator 106 employs an extremely high gain direct current amplifier similar to those employed in direct current electronic differential analyzers, with electronic integration performed by the use of capacitor feedback from output to input by a technique widely known and employed in the electronic computer art. If the gain of the amplifier is sufficiently high and if the capacitor is properly chosen with respect to dielectric polarization effect, the linearity of the integrator can be maintained to an extremely high value, particularly if the rate of change of output voltage is restricted to a sufficiently low value to permit the use of the high gain in the integrator amplifier without attendant loop stability problems. The input to the integrator amplifier consists of a reference voltage of fixed magnitude supplied by the source 107. The initial conditions determining the output voltage of the integrator at the start of the measuring cycle may be established by techniques well known in the art, using a suitable starting potential from the source 108.

The comparator 104 employed sums up algebraically the respective voltages impressed upon its input leads and produces an output pulse at an instant when the resultant magnitude of all its input voltages becomes zero. By means of the action of the control system, two voltage comparisons are made per measurement cycle. With the K2 relay in one of its alternate positions, suitable to a positive input potential, the first comparison produces an output pulse from the comparator at the instant when the output of the integrator passes through zero. This is accomplished by comparing the integrator output with ground voltage (zero), from 102. Immediately following the time when the integrator voltage passes through zero the output pulse from the comparator 104 opens the pulse gate 111 to let timing or clock pulses from oscillator 112 pass into pulse counters 113 to be counted The polarity switch 116 acts in response to the said output pulse from the comparator 104 to operate the K2 relay to transfer the proper input lead of the comparator from ground to the voltage to be measured. Later, the comparator 104 generates a second output pulse when the instantaneous value of the integrator output voltage is equal to the sum of the offset voltage and the voltage to be measured. Since the rate of change of output voltage of the integrator is dependent upon the time constant of the integrator circuit and the magnitude of the reference voltage, it is apparent that the time interval between the two comparator pulses identified above is equal to the time constant of the integrator multiplied by the ratio of the input voltage to the reference voltage, taking into account the offset voltage, the effect of which will be described in detail hereinafter. In constructing the specific embodiment shown, the counters used were the Hewlett-Packard Type AC–4A. Since the time constant of the integrator can be maintained to a very high degree of accuracy, the integrator-comparator system functions to convert, with very great accuracy, the ratio of input voltage to reference voltage into a time interval which is measured by the counter system. In the device described the time constant of the integrator (and accordingly the time interval required to measure a voltage equal in magnitude to the reference voltage) is of the order of one second, although a considerable deviation from this value in either direction is entirely reasonable if suitable design precautions are taken.

Voltages of either algebraic sign may be measured by the system disclosed herein by means of one of the principal features of the invention. In the integrator as usually designed, a positive reference voltage will give rise to a negative-going output ramp function in the integrator. The comparator as usually designed gives an output pulse when the sum of the input voltages is zero. Hence with a positive reference voltage a positive voltage to be measured will combine with the negative-going ramp voltage to give a zero summation voltage and produce an output pulse in the comparator. Similarly, with a negative reference voltage, a negative voltage to be measured will give the zero summation voltage necessary to produce an output pulse. In both these cases it is assumed that the ramp function starts at zero. It is not necessary however that the ramp function start at zero. In accordance with the present feature of the invention, the ramp function is constrained to start at a value of voltage materially different from zero and to run with values which first decrease toward zero, then pass through zero and increase thereafter in the opposite sense from that present at the start.

Figure 2:
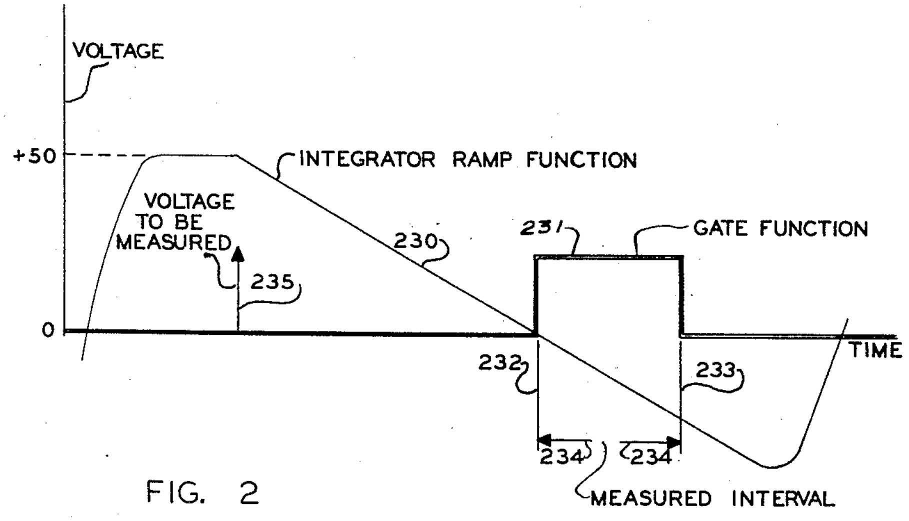
Figs. 2 and 3 are graphs useful in explaining the operation of the system of Fig. 1.

Fig. 2 is useful in explaining how the system of Fig. 1 operates in the case when the reference voltage and the voltage to be measured are of the same algebraic sign in the system as usually designed. In the figure, voltage is plotted as a function of time. Saw-tooth wave 230 represents the cyclically repeating ramp function of the integrator, shown for the case of a negative-going ramp function. The gate function 231 represents the sequence of voltages impressed upon the comparator 104 by the K2 relay for the case hereinbefore described wherein the ground potential is applied to the comparator before the voltage to be measured is applied thereto. The vertical line 232 indicates the time of occurrence of the first output pulse from the comparator, that is, the instant when the ramp function passes through zero. The vertical line 233 indicates the time of occurrence of the second output pulse, at the instant when the sum of the voltage to be measured and the instantaneous value of the ramp function becomes zero. The time interval between the arrows 234 is the interval measured by the pulse counters 113. The arrow 235 indicates the sign of the voltage to be measured (positive with respect to ground). The starting value of the ramp function is shown as plus 50 volts, which gives the integrator a suitable time interval in which to develop a strictly linear ramp function before the first comparison is made. For simplicity, the offset voltage is assumed to be zero, or else to be included in the magnitude of the voltage to be measured. The gate function 231 at the time of the first comparator output pulse makes an upward step and this step may be regarded as being of opposite sense to the time rate of change of the ramp function. This is the sense that results in generating a second comparator output pulse. If a downward step is effected, a second output pulse cannot occur.

Figure 3:
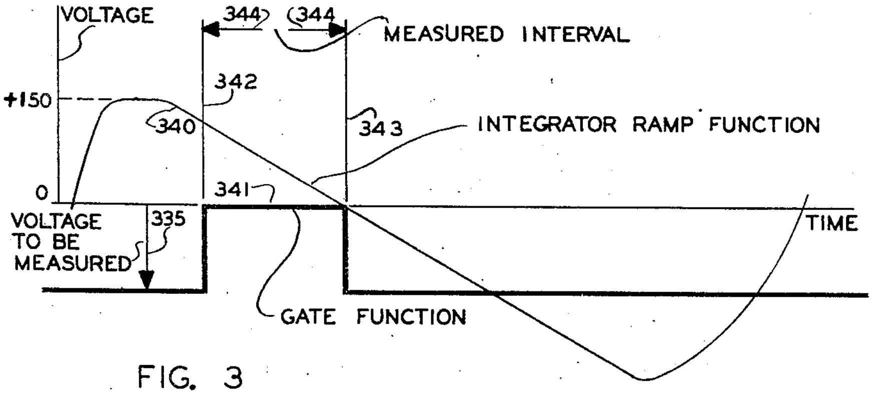

Fig. 3 shows how the system of Fig. 1 operates in the case when the reference voltage and the voltage to be measured are of opposite algebraic sign in the system as usually designed. Sawtooth wave 340 represents the cyclically repeating ramp function of the integrator, and this wave is similar to wave 230 in Fig. 2, except that here the ramp function is shown as starting at plus 150 volts. The gate function in this case however, shown at 341, begins at a negative value equal in magnitude to the voltage to be measured and steps up to zero. In this case the K2 relay is operated to apply the ground connection to the comparator after the voltage to be measured instead of before. The gate function 341 therefore denotes that the sequence of operations is now such that the signal voltage is applied to the comparator before the ground potential is applied thereto which is exactly the reverse of the sequence shown in Fig. 2. The vertical line 342 indicates the time of the first output pulse from the camparator, at the instant when sum of the voltage to be measured and the instantaneous value of the ramp function becomes zero. The vertical line 343 indicates the occurrence of the second output pulse, at the instant when the ramp function passes through zero. The time interval between the arrows 344 is the interval measured by the pulse counters 113. The arrow 335 indicates the sign of the voltage to be measured (negative with respect to ground). The starting value of the ramp function is set at plus 150 volts to give the integrator a suitable time interval in which to develop linearity in the ramp function before the first comparison is made. For the embodiment illustarted the ramp function was adjusted to accommodate a negative input voltage up to 100 volts. Here again the gate function of this case 341, at the time of the first comparator output pulse makes an upward step, thereby making possible a second comparator output pulse.

Referring further to Figs. 1, 2 and 3, the self-cycling timer 114, through the K1′ relay, brings about repetitive action of the integrator 106 so that the output therefrom is a recurrent ramp function as shown at 230 in Fig. 2 and at 340 in Fig. 3. The polarity switch 116 is controlled by the comparator output to position the K2 relay so that after the first comparator output pulse it will always apply ground or signal voltage initially to the comparator 104 immediately after each fly-back action of the integrator output even though before the first comparator output pulse the K2 relay may happen to be in the wrong position with reference to the polarity of the input voltage as will be explained in detail hereinafter. Which voltage is applied first, whether ground or signal, is thus determined by the positioning of the K2 relay, which relay must be controlled, in the system as usually designed, to apply ground before signal if the voltage to be measured is positive, and to apply signal before ground if the voltage to be measured is negative. Thus the polarity switch 116 functions to control the K2 relay to determine the proper time order in which the voltage to be measured and a reference voltage, here ground reference zero voltage, are impressed upon the comparator input. As noted in reference to the gate functions in Figs. 2 and 3, this proper time order may be described as the one in which the voltage step from the first impressed voltage to the second is of opposite sense to the time rate of change of the sweep characteristic.

It will be evident that by proper control of the K2 relay in response to the polarity of the input potential the system of Fig. 1 may be put automatically into either of the two operating conditions represented by Figs. 2 and 3, respectively. Hence, it is not necessary to change the polarity of the reference potential at 107 when a voltage of either polarity is to be measured.

According to a second principal feature of the invention, the increment of voltage added by the source 101 to the voltage to be measured may be selected so as to equal or slightly exceed the total delay time introduced into the system by the finite operating and releasing time of the K2 and K3 relays or any other source of delay which is sufficient to interfere with accurate measurement of very small voltages. The voltage added by the source 101 is compensated in the final count registered by the pulse counters 113 by suitable manipulation of the counters under control of the auxiliary switch 117. For example, if a delay time of 10 milliseconds is considered sufficient for the K2 and K3 relays to operate, and if the time rate of descent in the ramp function (integrator run-down rate) is 100 volts per second, an offset voltage of one volt will correspond to the desired 10 millisecond delay. If the clock-pulse oscillator 112 supplies 100,000 pulses per second, then 1000 pulses occur in 10 milliseconds and 1000 pulses correspond to one volt of run-down. Therefore the pulse counters should be manipulated so as to subtract 1000 from the final count in order that the final count may indicate the correct value of the voltage to be measured. This manipulation of the counters is effected through the interaction between the auxiliary switch 117 and the counters 113.

Referring now to Figs. 4–7, the operating cycle of the system as a whole is controlled by the unsymmetrical multivibrator MV–1, which is either astable or monostable, depending on the voltage to which grid resistor R8 is returned. Potential supply sources 1000 and 1001 of plus 300 volts and minus 300 volts, respectively, are provided for connection to various portions of the system as indicated in the drawings. The negative side of the plus 300 volt source is grounded, as is also the positive side of the minus 300 volt source. When the cycling mode switch (Fig. 5) is set to the "automatic cycling" position, the multivibrator is free-running, with both grids and the cathode returned to minus 300 volts. When the switch is set to the "manual cycling" position, the grid of V7–A is returned to ground (the plate voltage) so that this half of the tube conducts heavily and the other half is cut off. The tube will remain in this condition until the "manual read" switch is closed. This switch applies a strong negative pulse through capacitor C14 to the grid of V7–A, cutting this half of the tube off and causing V7–B to conduct. This latter condition, which comprises the re-set part of a reading cycle, persists until C12, charged negatively by the drop in plate voltage of V7–B discharges through R5 and R6 and allows V7–A to conduct again.

When the circuit is set for automatic cycling, the two halves of the V7 tube, V7–A and V7–B, will alternate conducting periods in the usual mode of operation of a free-running multivibrator. The ratio of conducting and non-conducting periods for a given total time per reading cycle is fixed by the ratio of the capacitances of C11 and C12. The length of a reading cycle is determined by the setting of R6, which governs the discharge time of C12 after V7–A starts to conduct.

During a re-set period, when V7–A is cut off and its plate is at substantially ground voltage, the grid of V6–B is also at ground, and V6–B conducts, operating relays K1 and K1'. Relay K1', closing contacts 5 and 6, places a 150,000 ohm resistor R1 across the feedback capacitor C1 of the run-down circuit of the integrator 106. Relay K1, by interrupting the integrator input lead at contacts 1 and 2, makes the integrator input resistance 75,000 ohms, comprising resistor R20. The integrator is now readily seen to be a conventional negative feedback amplifier with a gain of two, determined as is well known in negative feedback amplifier art, by the ratio of the 150,000 ohm output resistance R1 to the 75,000 ohm input resistance R20. The integrator output potential is now readily set in known manner to either plus 50 volts or plus 150 volts by applying minus 25 volts or minus 75 volts, respectively, to R20. This is accomplished by the connection of the input lead of the integrator through contacts 2 and 3 of the K1 relay and contact 2 of the K2 relay. If the system is in the condition suitable for measuring a positive input voltage, the K2 relay is in the released condition at this time so that contact 2 is at minus 25 volts, applied thereto through its contact 1 from the voltage divider R68, R69, R70, connected in turn to the minus 300 volt supply. If, however, the system is in the condition suitable for measuring a negative input voltage, the relay K2 is in the operated condition at this time so that the contact 2 is at minus 75 volts, applied through contact 3 from another tap of the same voltage divider. It is necessary that the system be set up in such a manner that the relay K2, if not operating in the correct sequence when the input potential is first applied at the beginning of a measurement, will be made to fall into the correct sequence so that the integrator will be supplied with the correct starting voltage for the polarity of voltage to be measured and so that the relay will apply ground potential and input potential to the comparator input in the correct order, as will be more fully described below.

When C11 in MV–1 has discharged sufficiently to cause MV–1 to switch to its alternate state, which will be referred to as the "reading" state, V7–A becomes conducting and the grid of V6–B falls to about minus 80 volts, cutting off the plate current of V6–B and thereby releasing relays K1 and K1'. R1 is removed from the feedback circuit of the integrator by the resultant opening of the contacts 5 and 6 of the K1' relay, and the input circuit of the integrator is completed through contacts 1 and 2 of the K1 relay, and resistors R18 and R19 to a source of reference voltage. The latter source may be selected by the internal-external reference switch (Fig. 4) from internal and external sources of reference voltage. The integrator output voltage thereupon begins its run-down, at the rate of 100 volts per second, in the embodiment shown, starting from plus 50 volts or from plus 150 volts as the case may be.

During the reset portion of the measuring cycle, the counters for all digital orders in the pulse counters 113 (counters C1, C2, C3, C4 and C5, Fig. 6) are brought to zero indications by the opening of contacts 4 and 5 of relay K1. This relay opens the grid return lead of one side of each of the multivibrators (not shown) in the counters, forcing them into the correct state to give a zero reading. Opening of contacts 1 and 2 of relay K1' at this time similarly opens the grid return lead of one side of each of the switching multivibrators MV–3 and MV–4, permitting charging of capacitors C51 and C50, respectively. This insures that the start of a reading cycle will always find MV–3 in the correct position, with the clock pulses gated off from entering the counters. The situation with regard to MV–4 will be taken up in detail hereinafter.

The starting condition for MV–2 will now be discussed. In the case of this multivibrator there is no unique starting position. Reference to Figs. 2 and 3, particularly making a comparison of the gating pulses 231 and 341, respectively, shows that if, for any reason, the start of a cycle finds MV–2 and K2 in the wrong condition, anticipating, so to speak, the wrong polarity of input voltage, only one comparison will occur during that cycle. For example, first, if the system is anticipating a positive input voltage and instead the input voltage is negative, after the first comparison the comparator input will have just become negative as at time mark 232 in Fig. 2. Switching of MV–2 will then cause the comparator input voltage to drop abruptly due to applying a negative signal, instead of swinging position again, and since both the signal and the ramp voltage are of like sign a second output pulse will not occur during that measuring cycle. If, on the other hand, the system is anticipating a negative input voltage and instead the input voltage is positive, the first comparison will not occur until some time after the ramp function has become negative, i. e. not until some time later than the time indicated by the time mark 343 in Fig. 3. Switching of MV–2 will then leave the comparator input voltage negative since relay K2 then places ground potential on its contact 5 and again a second output pulse will not occur during that measuring cycle. In either case, MV–2 and K2 are left in the state opposite to that at that start of the cycle, which is exactly what is required to correct the situation which is caused by the voltage to be measured being opposite in polarity to what the system happened to be in condition to accommodate. In the next reading cycle, MV–2 and K2 will be poised for the true polarity confronting the circuit.

If the system were set for automatic cycling, the result of a false start as hereinbefore described would leave the counters without a stopping pulse, and thus they would run continuously after the first comparison until the end of the reading cycle. If the system were set for manual cycling, the system would count continuously until a new manual reading was made. Both of these conditions are undesirable, and are corrected by supplying a pulse to a second input circuit of MV–1, which pulse is arranged to appear, most conveniently in the present embodiment 10 milliseconds after the start of the count, in the case of a polarity error. This pulse forces the multivibrator MV–1 to return immediately to the re-set condition, from which it proceeds to make a corrected reading. The origin of this pulse is described hereinbelow.

Up to this point in the exposition it has been assumed that the input potential, whether positive or negative, is relatively large, e. g., greater than say half a volt in a system designed to measure to a maximum of 100 volts. It is now desirable to consider the effect upon the measurement of relatively small voltages when the operating and releasing time of the K2 and K3 relays is taken into account. Suppose first a case in which the relay delay is not deleterious. Suppose that the input voltage were plus 50 volts and that the relay K2 operated instantaneously. The voltage run-down as it appears at the comparator input is 50 volts per second, because the parallel addition of voltages in the input circuit of the comparator results in a halving of each of the voltages applied to the input circuit. For a discussion of a parallel summing amplifier reference may be made to U. S. Patent 2,401,779, issued June 11, 1946, to K. D. Swartzel, Jr. At the first comparison then, the comparator input would step instantly from zero volts to plus 25 volts, neglecting grid current at the input, which would limit the rise. In actual practice there will be a delay, the amount depending on the relay type, before the input lead of the integrator is firmly transferred from ground to the 50 volt signal, and during this time the integrator run-down is continuing. Suppose, for example, that the delay is two milliseconds, the integrator output voltage will have dropped to minus 200 millivolts at the time of transfer, and the resulting comparator input voltage will then be one half of 50 volts minus one half of 200 millivolts, or plus 24.900 volts. In the case of sufficiently large voltages to be measured, there is no error in the final reading; it merely transpires that the comparator input does not follow the correct ramp function for two milliseconds after the first comparison. Thereafter, however, the comparator input does behave properly and reaches ground potential at the proper time.

Finite relay operating time becomes important when the voltage to be measured is relatively very small. Using the two millisecond delay postulated above, if the input voltage is plus 100 millivolts the comparator input will not swing positive at the time of transfer but will step up only to minus 50 millivolts and a second comparison cannot be made.

Figure 4:
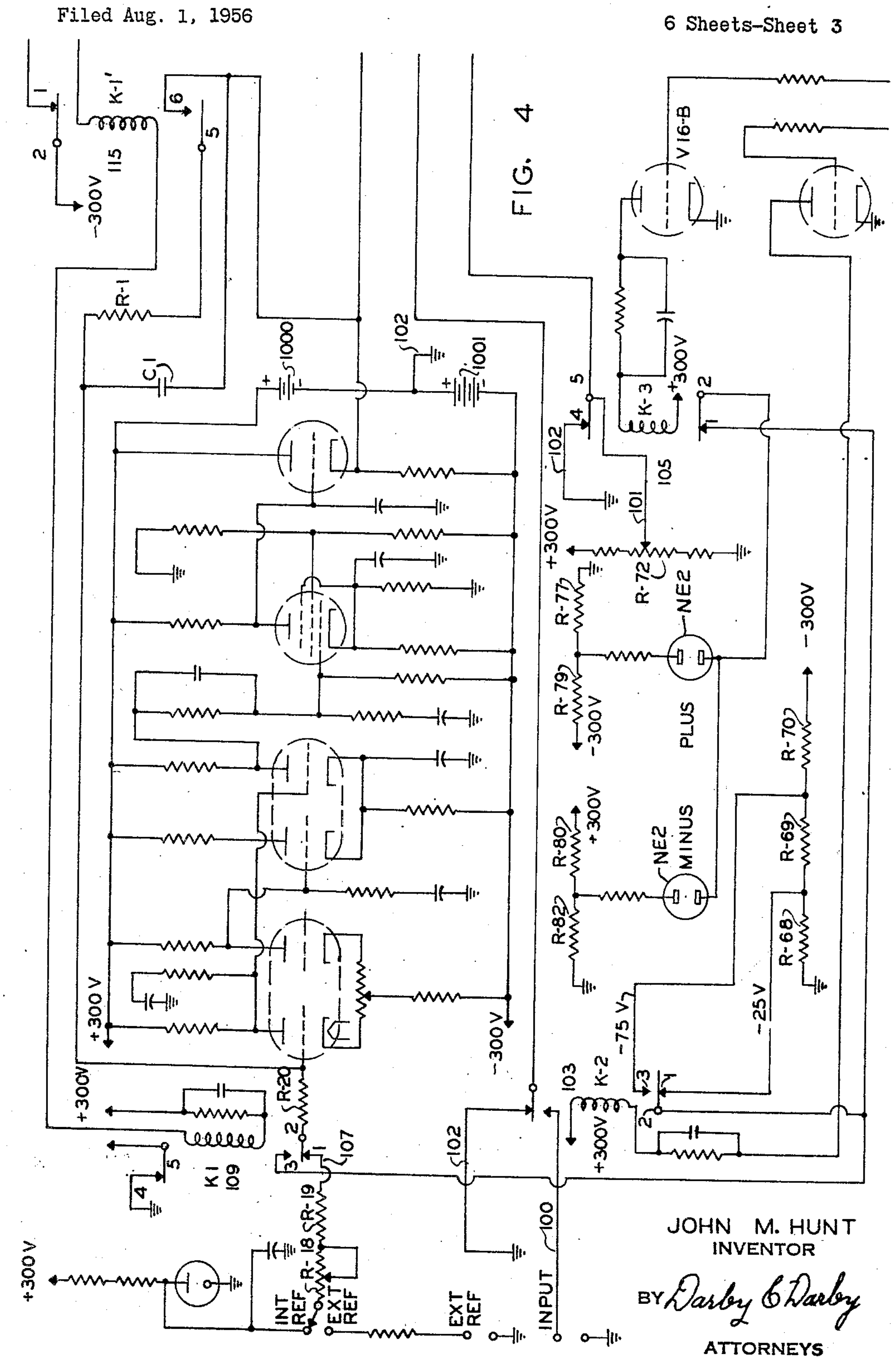
Figs. 4–7 are detailed circuit schematic diagrams of portions of the system of Fig. 1.
Figure 5:
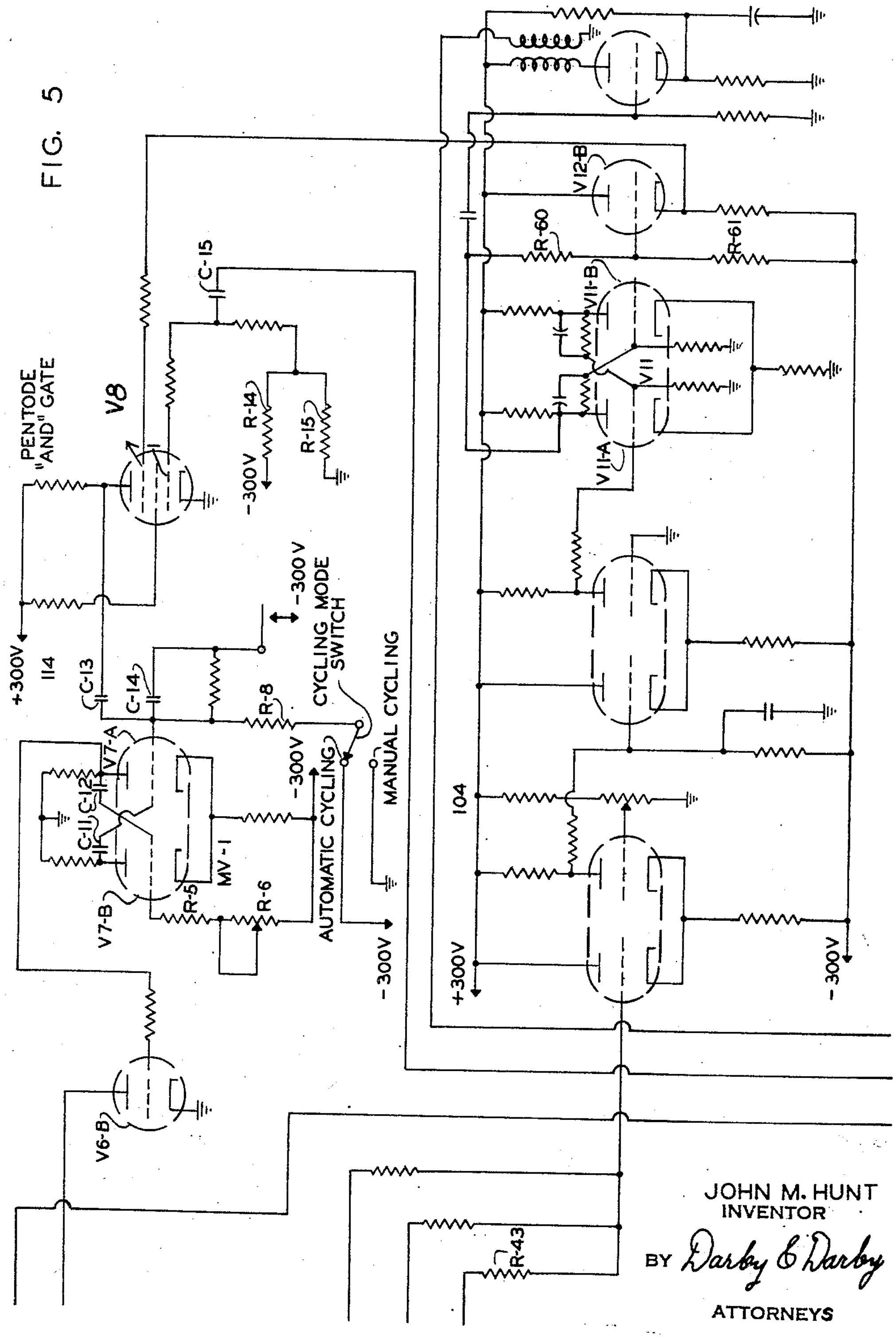
Figure 6:
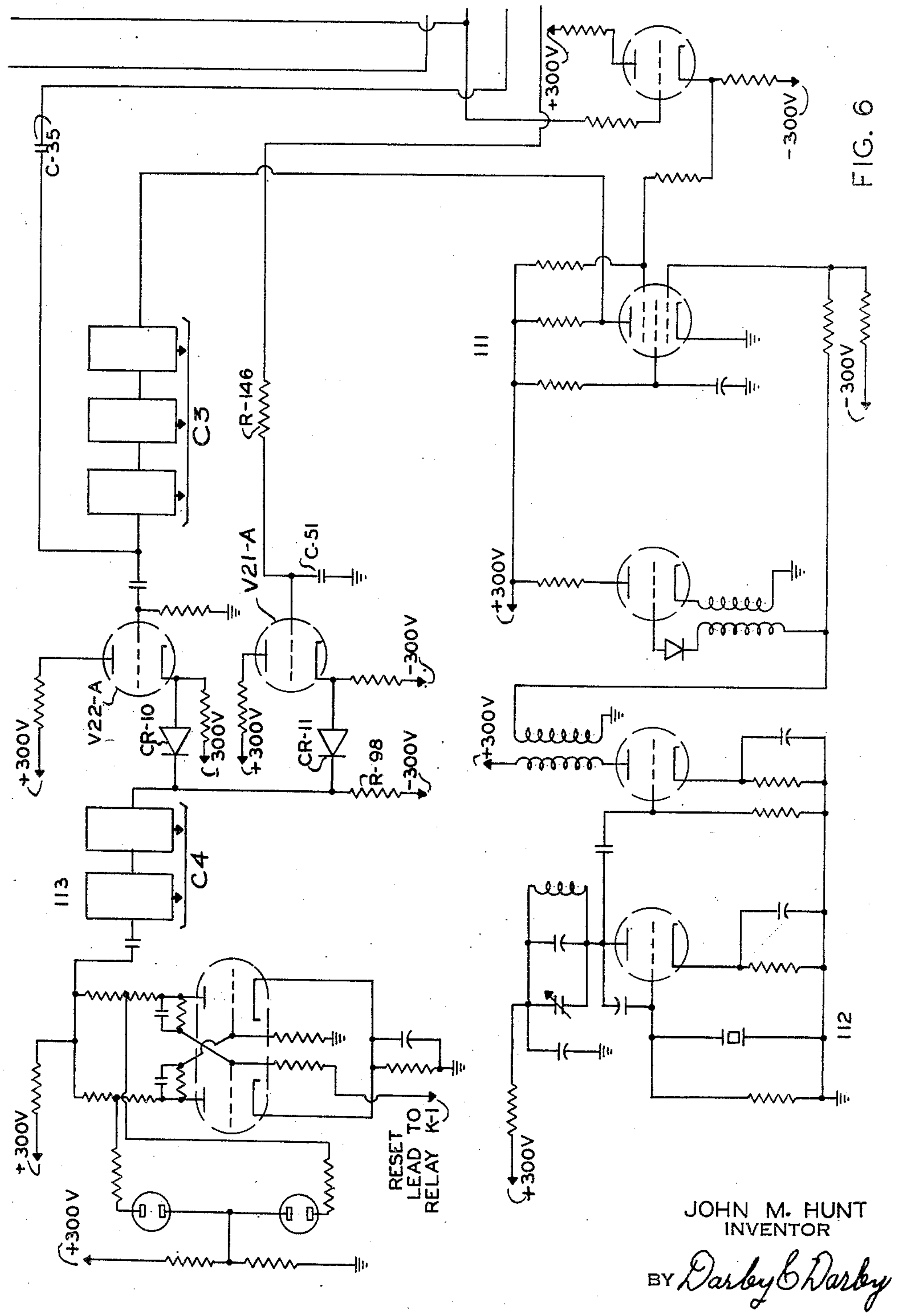
Figures 7, 8:
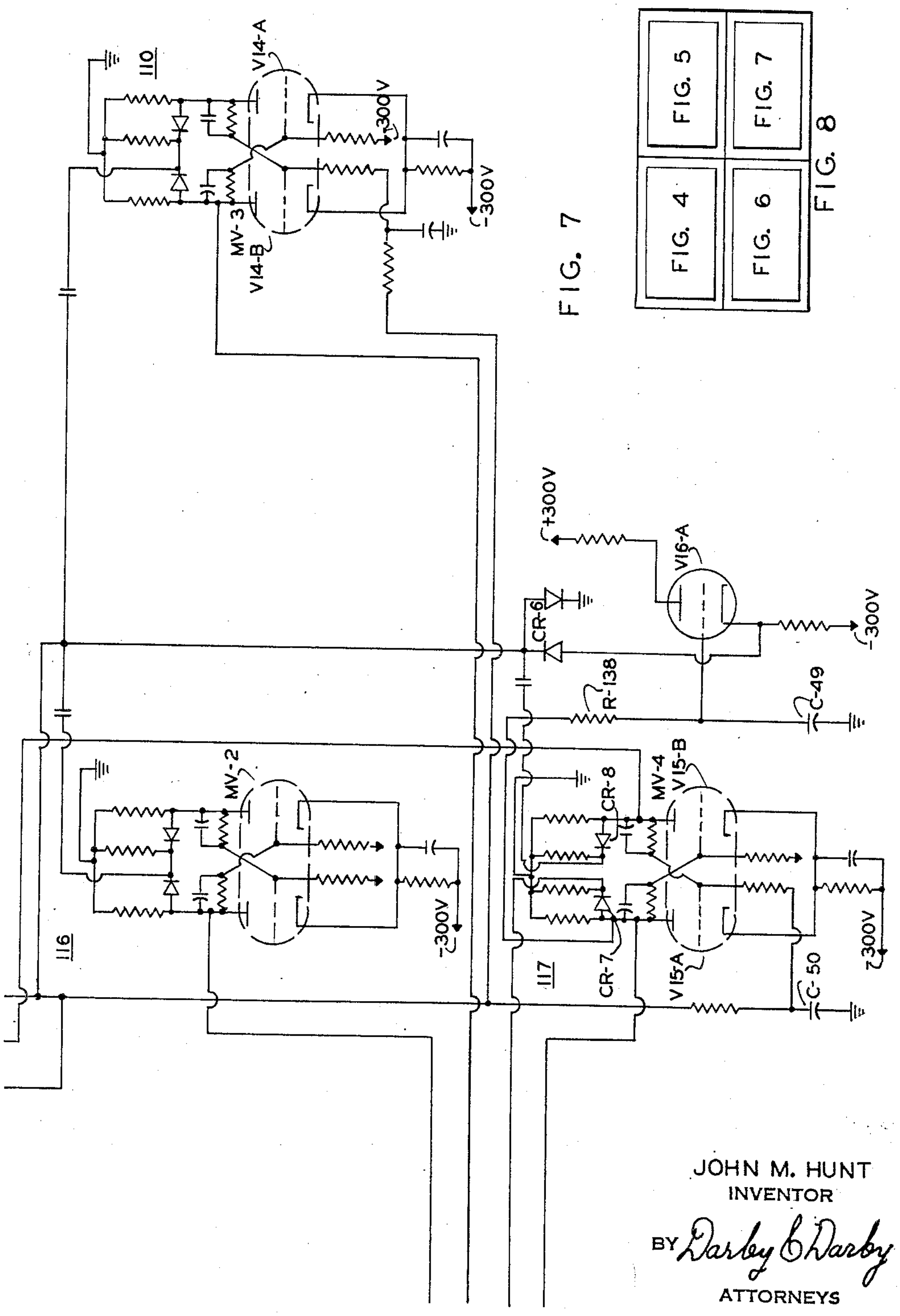
Fig. 8 is a diagram showing how

To avoid this limitation on the accuracy of measurement of relatively very small voltages an additional, or offset, potential, one volt in the present embodiment, is added to the input of the comparator along with the integrator ramp function and the actual input signal to be measured. This addition is made after the first comparison, and it is convenient to make the addition automatically in every measuring cycle regardless of the magnitude of the voltage to be measured. Referring to Figs. 4 and 7, MV–3, the multivibrator which gates the clock pulse on or off, and which corresponds to the on-off control switch 110 shown in block form in Fig. 1, also controls the operation of relay K3, through triode V16–B. At the start of a cycle the plate of V14–B is about 80 volts negative, since its half of MV–3 is conducting, and triode V16–B is cut off. Relay K3 is therefore in released condition, applying ground potential to the comparator input through contacts 4 and 5 of the relay and R43, and effectively adding zero volts to the comparator input. After the first comparison, when MV–3 is switched to the condition for gating the clock pulses into the counters, it also causes triode V16–B to conduct, since the plate of V14–B swings to ground potential; and relay K3 operates. This operation removes the ground from contact 5 of K3, and causes the one volt signal at the tap of R72 to be added to the comparator input and in turn causes the second comparison to occur 10 milliseconds later than it otherwise would, irrespective of whether the input signal to be measured is positive or negative. One volt is used for the offset voltage because this allows 10 milliseconds (the time equivalent of one volt in the embodiment being described) for relays K2 and K3 to operate, and because it is convenient to subtract one volt automatically by manipulating the counter circuits.

With this modification, as there are now three parallel input voltages impressed upon the comparator input, the run-down rate at the comparator grid becomes 33.333 volts per second, but now, even if the input is grounded at block 100, Fig. 1, corresponding to zero volts to be measured, the system will still have time to make two comparisons during the reading cycle. Again assuming a two millisecond delay in relay operation, and assuming a grounded signal input, the comparator input at the time of relay transfer will step to plus 267 millivolts, which causes the comparator to pulse out again eight milliseconds after the first relay transfer is completed.

At this time the count would stop with an indicated voltage of 1.000, in the absence of additional circuitry. Since counter C4 represents the units place in the voltage reading, it is necessary to intercept and discard the first output pulse from counter C3 in order to eliminate the effect of the one-volt addition. To do this is one of the functions of the auxiliary switch 117 which includes the multivibrator MV–4.

MV–4 is always restored to its correct starting condition during the re-set period of a reading cycle, because the grid return of V15–A is opened at contacts 1 and 2 of relay K1'. This opening, permitting C50 to charge negatively with respect to ground, causes V15–A to conduct, so that its plate is at minus 80 volts. The first output pulse from the comparator is injected into the grid of V15–A via the diode CR8 and the plate-grid coupling circuit of the multivibrator. This pulse cuts off V15–A, so that its plate goes substantially to ground potential. Diodes CR10 and CR11 driven by cathode followers V22–A and V21–A, respectively, form a gate of the type requiring the concurrence of two conditions for its operation. Such a gate is termed an "and" gate since it performs a function described in the algebra of logic by the term "and." To distinguish this gate from a pentode "and" gate V8 in Fig. 5, the present gate is designated as the diode "and" gate. The voltage at the junction of the diodes CR10 and CR11, at the input of counter C4, will be close to the cathode voltage of whichever cathode follower is more positive than the other. For example, if the cathode of V21–A is at ground, diode CR11 will conduct, because it is returned to minus 300 volts through R98. The low voltage drop across the diode CR11 keeps the input to counter C4 only a volt or so negative. If the cathode of V22–A is 80 volts negative, diode CR10 will not conduct, and the negative voltage will not be seen at the junction of the diodes. If the cathode of V21–A drops to minus 100 volts, the voltage at the junction will drop to slightly less than minus 80 volts, where it will be held by the presence of conduction through CR10. Thus a negative voltage can be applied to counter C4 only if both V21–A and V22–A are negative at their respective cathodes.

When MV–4 is switched by the first comparator output pulse of a reading cycle and the plate of V15–A goes to ground, the grid of V21–A also returns to ground and its cathode is a few volts positive. Ten milliseconds later the one thousandth clock pulse after the start of the count causes counter C3 to pulse out for the first time. This being a negative pulse and appearing at the cathode of V22–A, cannot affect counter C4, because the input to that counter is held positive by CR11. Therefore the first one-volt counter pulse does not register on the counter. This pulse is, however, coupled into MV–4 by C35 and CR7, causing MV–4 to return to its starting condition, with the plate of V15–A at minus 80 volts. The cathode of V21–A now drops to almost this voltage; with a slight delay introduced by the time constant of R146 and C51. The delay makes the voltage drop at the junction of the diodes slow enough so that counter C4 will not register a count, in case the negative pulse at the grid of V22–A has not decayed sufficiently to restore the cathode of V22–A to ground level. For succeeding output pulses from counter C3 the input voltage to counter C4 will be controlled by the voltage of the cathode of V22–A, so that the pulses from counter C3 now will be recorded in counter C4.

The switching of MV–4 by the first comparator output pulse to set it in an apparently incorrect condition at the start of the reading cycle and its return to starting condition by the first one-volt counter pulse as described in the preceding paragraph is necessary because of another function of MV–4, namely to control the output lead from the comparator so that succeeding pulses will not be allowed to switch the multivibrator within ten milliseconds after the first comparison pulse appears. The first situation in which this safe-guard is needed occurs when the circuit is anticipating a positive voltage and is confronted instead with a small negative voltage. The initial comparison is made with ground on the input lead, and the second with the input signal plus one volt. If the input is, say, minus 600 millivolts, the comparator input will jump to a small positive value and will then pass through ground potential for a second comparison four milliseconds after the first, stopping the count at a false indication of plus 400 millivolts. The system would have no means of correcting itself on subsequent readings. It is necessary to force the count to continue for at least 10 milliseconds, at which time the normal polarity check, described hereinafter, can be made successfully.

The second reason for gating off the comparator output lead after the first comparator output pulse is that there is a possibility of contact chatter in relay K2 at the time the input lead is transferred, causing multiple excursions through zero at the comparator input, and a series of false output pulses.

To guard against these possibilities, MV–4 controls the comparator output lead through V16–A and CR6. When the reading cycle starts, the grid and cathode of V16–A are both negative, and the first comparator pulse is not affected by CR6. When MV–4 is switched, the grid of V16–A goes to ground potential, after a delay caused by the time constant of R138 and C49, which insures that all multivibrators have time to respond to the pulse, and CR6 now clips any succeeding negative pulse. When MV–4 is returned to its starting condition by the first output pulse from counter C3, ten milliseconds later, the grid of V16–A again swings negative, and the comparator output lead is free to transmit the next pulse.

The remaining function of MV–4 is to assist in the recognition of the polarity of the unknown voltage. It does this in conjunction with the pentode "and" gate V8, which checks the direct-current condition of the comparator output at the instant that MV–4 is switched by the output from counter C3. To understand this, suppose that the circuit starts a cycle with MV–2 and K2 in the correct state for the polarity of the input signal. Then ten milliseconds after the first comparison the comparator input either must be positive, or, at worst, crossing through zero. This is true because the one-volt run-down of the integrator during the first ten milliseconds cancels out the one-volt offset signal added through relay K3, and the transfer of the input lead through relay K2 makes the signal added through this relay more positive after the transfer than before. That is, the input voltage of the comparator is made to pass from zero to a positive voltage, or from a negative voltage to zero, as the case may be. If, however, the circuit anticipated the wrong polarity, then the transfer of the input lead at relay K2 will make the signal added through this relay more negative after the transfer, and the comparator input will be negative at time ten milliseconds after the first comparison. Since the voltage at the comparator input is constantly changing it is not used directly in the polarity check. Instead, the voltage at one of the plates of the third stage V11 of the comparator is used, since this stage, by virtue of its plate-grid feedback, can only be in either of two possible states. The voltage at the plate is a sharply defined indication of the polarity of the comparator input voltage. This plate will be at about plus 200 volts if the input grid is positive, and it will be at plus 300 volts if the input grid is negative. The voltage of this plate is direct-coupled to one control grid, grid 7, of V8, through the cathode follower V12–B. R60 and R61 translate the voltage swing so that it centers around zero at the grid of V12–B, and therefore at grid 7 of the pentode V8. The other control grid, grid 1 of V8, is normally biased negative by R14 and R15, and is capacitor-coupled by C15 to the plate of V15–B of MV–4. At the instant when MV–4 is switched by the first output pulse from counter C3, i. e., ten milliseconds after the first comparison, a positive pulse is applied through C15 to grid 1 of V8. If the comparator input is positive, indicating proper operation, this pulse will be inhibited by a negative voltage on grid 7 of V8, because the plate of V11–A in the comparator will be in its low voltage state. If the comparator input is negative, indicating an input signal whose polarity is not the one for which the system is prepared, grid 7 of V8 will be positive, because the plate of V11–A will be in its high voltage state. The positive pulse on grid 1 will then cause the pentode to conduct. The drop in its plate voltage is coupled through C13, as a negative pulse upon the grid of V7–A in the timer 114, whereby multivibrator MV–1 is immediately switched into its re-set condition, summarily starting a new reading cycle. This negative pulse is the pulse referred to hereinabove, at which point its origin was not explained. Since MV–2 is not affected by the re-set it remains in the state it was in after the first comparison pulse in the interrupted cycle. It is now prepared for the true polarity of the voltage to be measured.

It was indicated hereinabove that the condition of relay K2 during re-set is used to set the integrator to the proper starting voltage. To do this, the voltage applied to the integrator input during re-set is picked up at contact 2 of relay K2, which voltage is either minus 25 volts (with positive input signals) or minus 75 volts (with negative input signals). This same voltage is applied through contacts 1 and 2 of relay K3 to two polarity lamps NE–2, Plus and Minus. The Plus lamp is returned to a voltage divider, comprising R77 and R79, and the Minus lamp is returned at the junction of R80 and R82. When K2 is in the released condition the Plus lamp glows, and when the relay is in the operated condition the Minus lamp glows. These lamps provide the proper indication of signal polarity at all times except during the count. When the count is in progress the lead to both lamps is open circuited by contacts 1 and 2 of relay K3 to avoid momentary reversal of the polarity indication.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Direct voltage measuring apparatus comprising in combination a linear integrator operable over a range of output voltages extending between a material positive value and a material negative value, said integrator having a voltage sweep characteristic decreasing in output voltage during the sweep time, a voltage comparator responsive to the algebraic sum of any voltages simultaneously impressed thereon to generate an output pulse whenever the said algebraic sum is zero, means to impress upon the input circuit of the voltage comparator the output of the said integrator, cycling means for the integrator, switching means for impressing upon the input circuit of the voltage comparator a voltage to be measured thereby generating a first output pulse in the said comparator at the instant when the integrator voltage becomes equal in magnitude to the voltage to be measured, and switching means actuated by said first output pulse for initiating a time measurement and removing the voltage to be measured from the input circuit of the voltage comparator and substituting a zero voltage connection to the input circuit of the comparator, thereby generating a second output pulse in the said comparator at the instant when the integrator passes through zero value.

2. Direct voltage measuring apparatus comprising in combination a linear integrator operable over a range of voltages between a material positive value and a material negative value, said integrator having a sweep characteristic of given algebraic sign of change of voltage as a function of time, means to generate a gate function comprising a voltage step equal to a given voltage to be measured plus an offset voltage to compensate for finite stepping time, a comparator responsive to the algebraic sum of any two voltages impressed thereon to generate an output pulse whenever the said algebraic sum is zero, means to impress upon the input circuit of the comparator simultaneously the output of the said integrator and the said gate function voltage, whereby two output pulses are generated in succession by said comparator with a time interval therebetween proportional to the voltage difference represented by said gate function, and timing means prearranged to compensate for said offset voltage, whereby the apparatus is made direct-reading with respect to the given voltage to be measured.

3. Direct voltage measuring apparatus comprising in combination a linear integrator operable over a range of voltages between a material positive value and a material negative value, said integrator having an output voltage decreasing in value as a function of time, a comparator responsive to the algebraic sum of a plurality of voltages impressed thereon to generate an output pulse whenever the said algebraic sum passes through zero, first switching means to impress upon the input of the comparator as a first impressed voltage the output of said integrator and simultaneously as a second impressed voltage the voltage to be measured and ground reference zero voltage in a particular time order, second switching means for controlling said first switching means to determine the time order in which the voltage to be measured and the ground reference zero voltage are impressed so that there is an upward voltage step from the first to the second whereby first and second output pulses are generated by the comparator, and means actuated by the said first output pulse for impressing upon the input of the comparator a positive offset voltage, whereby the occurrence of the second output pulse is delayed for a predetermined time interval to allow the said switching means to complete their operation.

4. Direct voltage measuring apparatus comprising in combination a linear integrator having a sweep characteristic of given algebraic sign of rate of voltage change as a function of time, a comparator responsive to the algebraic sum of a plurality of voltages impressed thereon to generate an output pulse whenever the said algebraic sum passes through a predetermined particular value, first switching means to impress upon the input of the comparator as a first impressed voltage the output of said integrator and at the same time as a second impressed voltage the voltage to be measured and a reference voltage in a particular time order, said first and second impressed voltages being both within the voltage limits of the sweep characteristic, second switching means for controlling said first switching means to determine the time order in which the voltage to be measured and the reference voltage are impressed so that the voltage step from the first to the second is of opposite sense to the time rate of change said sweep characteristic, whereby first and second output pulses are generated by the comparator, and means actuated by the said first output pulse for impressing upon the input of the comparator an offset voltage of such polarity as to delay the occurrence of the said second output pulse, whereby a time interval is provided within which the said switching means may complete their operation.

5. In a direct voltage measuring apparatus the combination of a linear integrator having a sweep characteristic covering a range of voltages between a material positive value and a material negative value, a comparator responsive to the algebraic sum of a plurality of voltages impressed thereon to generate an output pulse whenever the said algebraic sum passes through a predetermined particular value, means to impress the integrator output upon the comparator input, means to restore the integrator to a starting condition, switching means independent of said restoring means to impress upon the input of the comparator the voltage to be measured and a reference voltage in a particular time order, means responsive to the polarity of the voltage output of the integrator, said latter means being in controlling relationship to said restoring means, and means to actuate said polarity responsive means upon the occurrence of the first comparator output pulse to restore the apparatus with the exception of the said independent switching means to the starting condition in response to one particular polarity of the integrator output voltage as distinguished from the opposite polarity thereof, said independent switching means thereby remaining in the same condition before and after the said first comparator output pulse for the said particular polarity of the integrator output voltage, whereby the said independent switching means is conditioned to impress the voltage to be measured and the reference voltage upon the comparator input in the correct time order appropriate to the true polarity of the voltage to be measured.

6. In a direct voltage measuring apparatus the combination of a linear integrator having a sweep characteristic of given algebraic sign of rate of voltage change as a function of time, a comparator responsive to the algebraic sum of a plurality of voltages impressed thereon to generate an output pulse whenever the said algebraic sum passes through a predetermined particular value, means producing an auxiliary pulse at a predetermined time interval after the occurrence of a comparator output pulse, a logical "and" gate circuit having two input terminals, means producing a potential indicative of the polarity of the voltage to be measured, circuit means supplying said polarity indicative potential to one input terminal of said gate circuit, circuit means supplying said auxiliary pulse to the other input terminal of said gate circuit, said gate circuit being operative only upon coincidence of the auxiliary pulse and a potential indicative of one particular polarity of the voltage to be measured as distinguished from the opposite polarity, and means actuated by operation of said circuit to restore the apparatus to a starting condition, whereby a voltage measurement is interrupted if the system is not prepared for the particular signal voltage to be measured that is impressed thereon.

7. In a direct voltage measuring apparatus, the combination of a linear integrator having a sweep characteristic of given algebraic sign of rate of voltage change as a function of time, a comparator responsive to the algebraic sum of a plurality of voltages impressed thereon to generate an output pulse whenever the said algebraic sum passes through a predetermined particular value, means to impress the output of the integrator upon said comparator together with a voltage to be measured, a source of clock pulses, means for counting said clock pulses, said counting means being controlled by a comparator output pulse to start a count, means to cancel a predetermined initial number of counts, said last mentioned means comprising a logical "and" gate circuit having two input terminals, said gate circuit being operative only upon coincidence of potentials of like polarity upon its respective input terminals to transmit a counting pulse, an auxiliary switch actuated by said comparator output pulse to impress a voltage of given polarity upon one input terminal of said gate circuit, means to impress upon the other input terminal of the gate circuit a counting pulse of opposite polarity to the voltage impressed by the said auxiliary switch at the end of said predetermined initial number of counts, and delayed action means applying said counting pulse additionally to said auxiliary switch to cause the latter to reverse the polarity of the voltage impressed thereby upon the said gate circuit, whereby subsequent counting pulses may be transmitted through said gate circuit.

8. In a direct voltage measuring apparatus, the combination of a linear integrator having a sweep characteristic of given algebraic sign of rate of voltage change as a function of time, a comparator responsive to the algebraic sum of a plurality of voltages impressed thereon to generate an output pulse whenever the said algebraic sum passes through a predetermined particular value, means to impress the output of the integrator upon said comparator together with a voltage to be measured, a source of clock pulses, means for counting said clock pulses, said counting means being controlled by comparator output pulses to start and stop a count, a pulse clipper for making comparator output pulses ineffective to stop said counting means, an auxiliary switch activated by a comparator output pulse at the start of a count to connect said pulse clipper to the output of the comparator, means generating an auxiliary pulse at a predetermined time interval after the start of the count, and means actuated by said auxiliary pulse to operate the auxiliary switch to disconnect the said pulse clipper, whereby comparator output pulses occurring during said predetermined time interval are ineffective to stop the count.

9. In a direct voltage measuring system, a frequency stable pulse source, an electronic pulse counter, a linear electronic integrator, cycling means operable to force the output potential of said integrator to a predetermined starting potential and then to connect a source of a first reference potential to the input circuit of said integrator, voltage comparator means having a first input circuit connected to the output circuit of said integrator and a second input circuit, said comparator being operable to produce an output pulse substantially upon occurrence of equal but opposite potentials being applied to its input circuits, switch means connecting said second input circuit to a point at a second reference potential, gating means responsive to said output pulse to connect said pulse source to said counter and to connect said second input circuit to a test potential input terminal, said gating means also being responsive to a second output pulse occurring upon equality in magnitude of said integrator output potential and said test potential to disconnect said pulse source from said counter, and means responsive to the polarity of said test input potential for selecting the value of said predetermined first reference potential.

10. Direct voltage measuring apparatus comprising in combination a linear integrator operable over a range of output voltages extending between a material positive value and a material negative value, said integrator having a voltage sweep characteristic decreasing its output voltage during the time sweep, a voltage comparator, means to impress upon the input circuit of the comparator the output of the said integrator, means to impress upon the input circuit of the voltage comparator in succession the voltage to be measured and a zero reference voltage, and means to reverse the order in which said voltage to be measured and said zero reference voltage are impressed upon said comparator input circuit, whereby the voltage to be measured may be of either polarity irrespective of whether the integrator sweep characteristic is increasing or decreasing.

11. Direct voltage measuring apparatus comprising in combination a linear integrator, cycling means operable to force the output voltage of said integrator to a predetermined value and to connect a reference voltage to the input circuit of said integrator, comparator means operable to compare the output voltage of said integrator with a second reference voltage and to produce an output pulse upon equality of said voltages, gating means, switching means responsive to said output pulse to switch said comparator reference input voltage from said second reference voltage to the voltage to be measured and to close said gating means, and further switching means responsive to a second output pulse from said comparator at equality of said comparator input voltages to open said gating means.

References Cited in the file of this patent

Article by Dean W. Slaughter published in "Convention Record" of the March 23–26, 1953, IRE National Convention, part 7, pages 7–12. Copies available in Scientific Library and 235–61 ADC (only Fig. 1 of page 11 relied upon).